Jan. 16, 1951
J. D. BROWN
2,537,943
BEARING SEAL FOR MEAT GRINDERS
Filed June 10, 1946
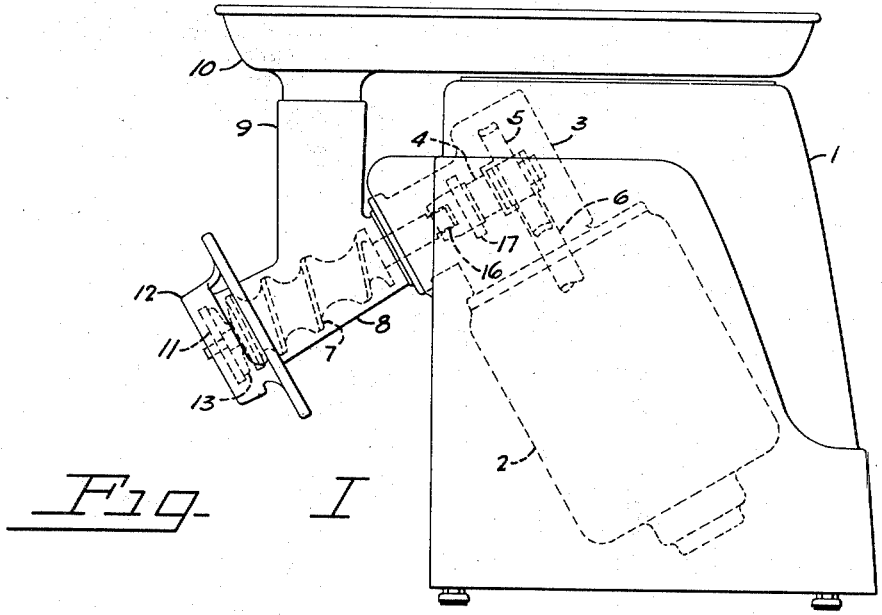
Fig. I
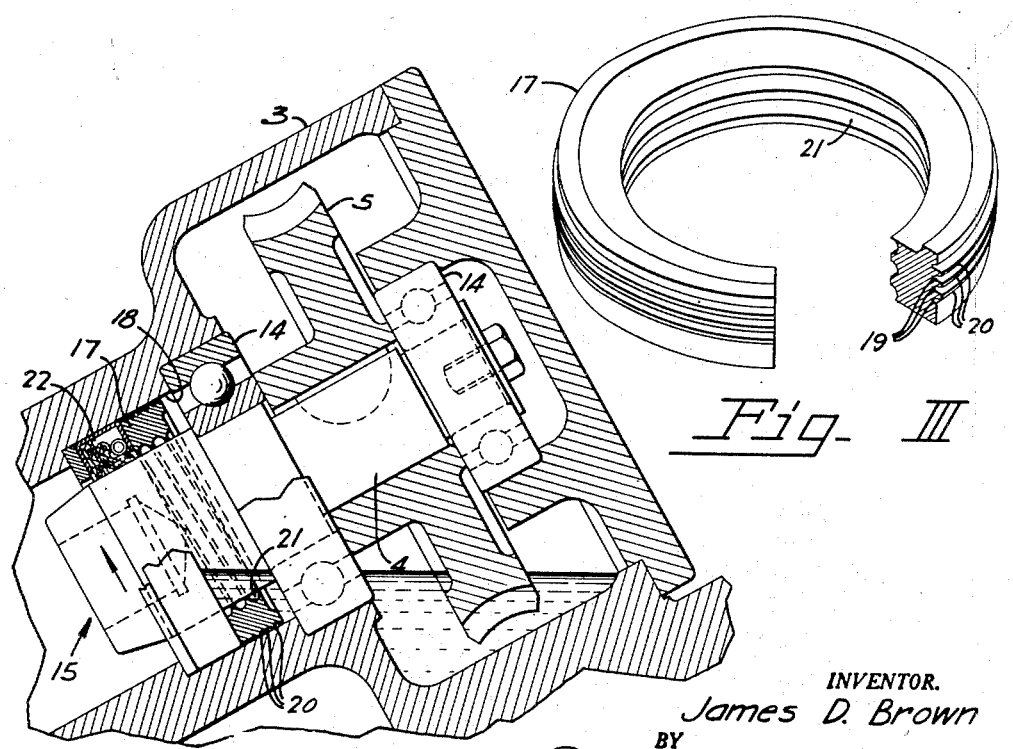
Fig. II
Fig. III
INVENTOR.
James D. Brown
BY
Marshall and Marshall
ATTORNEYS Patented Jan. 16, 1951

2,537,943

UNITED STATES PATENT OFFICE 2,537,943

BEARING SEAL FOR MEAT GRINDERS

James D. Brown, Toledo, Ohio, assignor to Toledo Scale Company, Toledo, Ohio, a corporation of New Jersey Application June 10, 1946, Serial No. 675,789

3 Claims. (Cl. 146—182)

This invention relates to food handling apparatus of the type employed for grinding or comminuting meat.

Application Ser. No. 579,729, which became Patent No. 2,531,158 on November 21, 1950, illustrates a meat grinding machine which employs a rotatable worm operating in an elongated tubular chamber to feed meat against a perforated plate over which there sweeps a set of sharp knives which cut off the small nodules of meat that protrude into the perforations. The machine shown in application Ser. No. 579,729 has a downwardly inclined worm chamber. This construction has many advantages but also has one serious disadvantage. This disadvantage results from the fact that when the upper end of a shaft is the driven end, since the gearing or other mechanism which drives the shaft must be lubricated, it is almost impossible to keep the lubricant from running down the shaft by action of the force of gravity. Because the shaft in this case leads directly into the interior of a food chamber of the machine it is absolutely essential that no lubricant be permitted to escape from the gearing and run down the shaft into the food chamber. The prevention of this escape of oil into the food chamber was the most serious manufacturing problem involved when the machine shown in application Ser. No. 579,729 was placed in production.

Conventional type thin bladed oil seals were first employed in an attempt to retain the oil in the gearing chamber. It was found that no matter how carefully these oil seals were constructed and no matter whether several or only one were employed, the oil still escaped from the gearing chamber and ran down inside the worm chamber.

When the meat chopping device was constructed in accordance with the instant invention the results were almost unbelievable. The leakage stopped immediately and none of the hundreds of machines since constructed has ever leaked as much as a single drop of oil. A machine constructed in accordance with the instant invention is just as simple to manufacture as those constructed prior to the development of the instant invention which employed conventional thin bladed oil seals and the expense of manufacture of the machine is even less than when the machine was equipped with conventional oil seals.

The object of this invention is, therefore, the provision in a food handling apparatus having an inclined food chamber and a shaft entering said chamber which is driven from above the said chamber; of means cooperating with the shaft to positively prevent the entrance of any lubricant into the food chamber.

In the drawings:

Figure I is a view in elevation of a meat chopper embodying the invention, certain parts being shown in dotted lines to indicate their location.

Figure II is a fragmentary vertical, sectional view on an enlarged scale of a gear housing and the gearing which is contained therein.

Figure III is a fragmentary isometric view on a still further enlarged scale of the means employed in a machine embodying the instant invention for the prevention of the ingress of lubricant into the food chamber of the machine.

A meat chopper embodying the instant invention of which a preferred embodiment is shown in Figure I, may comprise a housing 1 in which is mounted a drive motor 2. On the upper end of the motor 2 there is located a gear housing 3 in which is journaled an arbor 4. A worm gear 5 is keyed to the arbor 4 and is in driving engagement with a worm (not shown) which is secured on the upper end of a shaft 6 of the motor 2. The gearing which has just been briefly described constitutes a right angle drive between the motor 2 and a rotatable worm 7 which is journaled within a worm chamber 8. The worm chamber 8 is mounted on the forward part of the housing 1 and extends downwardly at a more or less 45 degree angle. The worm chamber 8 is in communication with a neck 9 and a meat receiving pan 10 which overlies the housing 1.

When meat is placed in the pan 10 and fed downwardly through the neck 9 into the chamber 8 it is forced through the chamber 8 by the worm 7 toward its lower end and up against a perforated plate 11 which is held across the chamber 8 by a clamping ring 12 where the small nodules which extend into the perforations of the plate 11 are severed by a rotating knife 13 which is driven by the worm 7.

In Figure II it can be seen that the arbor 4 is journaled within the housing 3 by a pair of bearings 14 and is provided with a socket 15 in its lower end. A tenon 16 (Figure I) on the upper end of the worm 7 is engaged in the socket 15 for driving the worm.

An oil pumping ring 17 is located within a bore 18 of the housing 3 and closely embraces the arbor 4 which extends concentrically through the bore 18. The ring 17 has a series of annular grooves 19 and annular flanges 20 on its periphery. The outside diameter of the flanges 20 is some few thousandths of an inch larger than the inside diameter of the bore 18 so that a relatively small pressure will deform the flanges 20 sufficiently to permit the entrance of the ring 17 into the bore 18 thus establishing a very tight force fit between the ring 17 and the bore 18.

A helical groove 21 is cut in the inner surface of the ring 17. The minimum inside diameter of the crest of the thread-like groove 21 is maintained some .003 to .005 of an inch larger than the outside diameter of the arbor 4 where it passes through the ring 17. The helical groove 21 is directed oppositely to the direction of rotation of the arbor 4, i. e. if the arbor 4 rotates in a "right hand" direction (as shown by the arrow in Figure II), for example, the helical groove 21 should be a "left hand" helix. This will assure that any lubricant which adheres to the outer surface of the arbor 4 will be engaged by the crest of the groove 21 and carried back up the arbor 4 by the frictional contact between the lubricant and the arbor 4 acting against the return lead of the helical groove 21.

A conventional type oil seal 22 is placed in the bore 18 below the ring 17 to prevent the escape of oil from the housing 3 when the chopper is not operating. When the arbor 4 is not rotating, the oil pumping ring 17 does not entirely prevent the oil from escaping down the arbor because it exerts its pumping action only when the arbor rotates with respect to the helical groove. The conventional oil seal 22 also prevents meat juices and moisture from entering the gear housing 3.

The ring 17 with its swageable flanges 20 and its internal helical thread 21 constitutes an essential element of a combination existing in the type of food comminuting machine shown herein. It contributes as much to the final operation of the machine as does the driving motor or the meat feeding worm or any other element of the combination with which elements it cooperates to produce a machine of the type disclosed.

The embodiment of the invention which has been disclosed may be modified to meet various requirements.

Having described the invention, I claim:

1. Driving mechanism for a meat grinding machine having a downwardly inclined food feeding chamber, said driving mechanism being located above said chamber and comprising, in combination, a drive housing having an exit bore in its lower portion, drive gearing in said housing, said housing containing a liquid lubricant for said gearing, a lubricant retaining ring tightly fitted into said exit bore, said ring having an open ended helical groove in its inner surface, a rotatable shaft driven by said gearing and extending downwardly from said housing through said bore and said ring and into the interior of said feeding chamber, said helical groove being directed oppositely to the direction of rotation of said shaft and the crest of said helical groove being closely circumjacent said shaft.

2. Driving mechanism for a machine comprising, in combination, a drive housing having a downwardly extending bore and containing a liquid lubricant and gears running at least partially in said lubricant, a driven shaft extending downwardly out of said housing through said bore and an annular lubricant retainer fitted stationarily and liquid tight within said bore and surrounding said shaft, said retainer having an open ended helical groove cut in its interior surface, the inside diameter of the crests of said helical groove being but slightly greater than the outside diameter of said shaft and the groove being directed to lead toward the interior of the housing when followed in the direction of rotation of the shaft.

3. An annular lubricant retainer for a gear housing having a downwardly extending exit bore and a smooth-surface driven shaft extending therethrough, that is characterized by being fitted in liquid tight engagement in said bore and closely circumjacent said shaft and that has an unobstructed helical groove cut in its inner surface leading from the outside of the housing to the inside when followed in the direction of rotation of the shaft.

JAMES D. BROWN.

REFERENCES CITED

The following references are of record in the file of this patent:

UNITED STATES PATENTS

| Number | Name | Date |
|---|---|---|
| 924,897 | Emmet | June 15, 1909 |
| 1,457,910 | Loichot | June 5, 1923 |
| 1,484,525 | Noeggerath | Feb. 19, 1924 |
| 1,545,514 | Pfouts | July 14, 1925 |
| 1,780,914 | Gullberg | Nov. 11, 1930 |
| 1,817,775 | Sipe | Aug. 4, 1931 |
| 1,851,653 | Stimpson et al. | Mar. 29, 1932 |
| 2,038,731 | Gunderson | Apr. 28, 1936 |

FOREIGN PATENTS

| Number | Country | Date |
|---|---|---|
| 555,521 | Germany | July 23, 1932 |